United States Patent
Bayer

3,771,061
Nov. 6, 1973

[54] DECADICALLY ADJUSTABLE OSCILLATION GENERATOR WITH FREQUENCY MARKER

[75] Inventor: Herbert Bayer, Reutlingen, Germany

[73] Assignee: Wandel U. Goltermann, Reutlingen, Germany

[22] Filed: Feb. 14, 1972

[21] Appl. No.: 225,743

[30] Foreign Application Priority Data
Feb. 13, 1971 Germany.................. P 21 06 977.2

[52] U.S. Cl................... 325/67, 325/131, 325/363, 331/178
[51] Int. Cl............................................. H04b 1/00
[58] Field of Search...................... 325/67, 131, 363; 324/57 R; 331/178

[56] References Cited
UNITED STATES PATENTS
3,593,144   7/1971   Coenning et al....................... 325/67
3,596,193   7/1971   Dunwoodie...................... 331/178 X
3,253,216   5/1966   Feldman........................... 324/57 R

*Primary Examiner*—Felix D. Gruber
*Assistant Examiner*—James F. Gottman
*Attorney*—Karl F. Ross

[57] ABSTRACT

A decadically adjustable oscillation generator, with a ten-stage ring counter for each decade working into a respective gating network to select a constituent of a composite frequency, delivers its several counter outputs to a digital/analog converter for producing a horizontal sweep voltage of an oscilloscope indicating the variations in amplitude or phase of an output voltage from a test object energized with that frequency. As the counters are periodically stepped forward and backward to modulate their composite output frequency between selected limits, the sweep voltage is matched with a manually selected reference voltage in a comparator generating a trigger pulse upon equality of the two voltages. The current readings of the several counters, continuously transmitted to respective stages of a buffer register in parallel with the digital/analog converter, are transferred to a visual indicator by the trigger pulse which also causes the display of a frequency marker on the oscilloscope screen.

5 Claims, 1 Drawing Figure

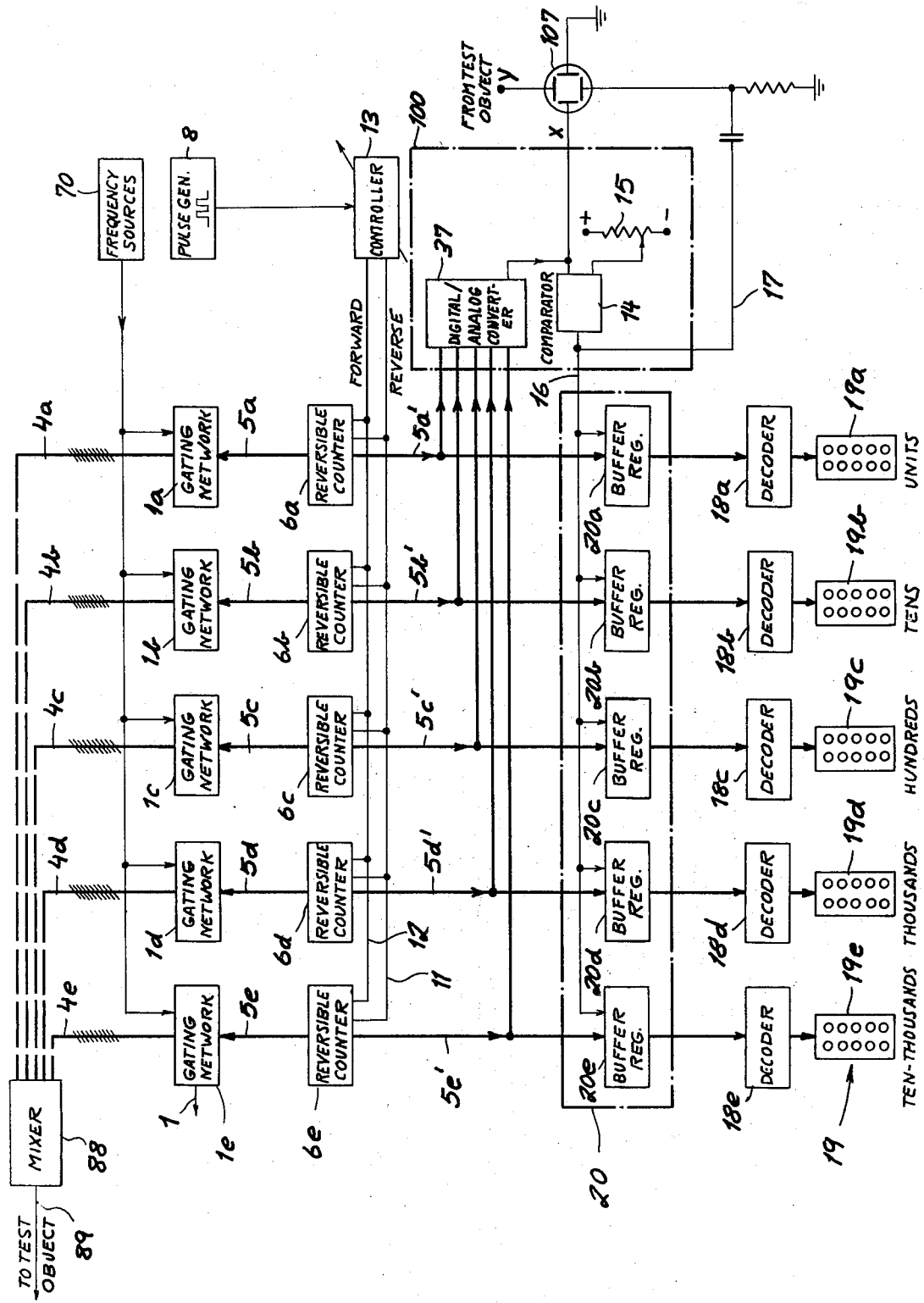

DECADICALLY ADJUSTABLE OSCILLATION GENERATOR WITH FREQUENCY MARKER

My present invention relates to a decadically adjustable oscillation generator of the type described in commonly owned U.S. Pat. No. 3,593,144 to Frank Coenning et al.

Such an oscillation generator comprises a plurality of cascaded decadic ring counters which work into respective gating networks serving for the blocking and unblocking of a set of ten basic frequencies so as to synthesize a composite output frequency whose numerical value corresponds to the combination of the decadic readings of the several counters. This composite frequency can be modulated or "wobbled," between selected limits, with the aid of a counting-pulse generator stepping the counting chain in a periodic sawtooth-shaped or symmetrically triangular pattern, the limits of the modulating sweep being established by a coincidence gate with inputs selectively connectable to different stage outputs of the counters. With the attainment of the selected setting of the counting chain, the coincidence gate generates a signal which reverses the sweep or restarts it at the other limit.

As further described in that patent, individual selectors in the output circuits of the several counters form part of a monitoring circuit designed to generate an output signal as the composite frequency passes through a set value not necessarily coinciding with one of the limits of its sweep. The adjustment of these individual selectors is somewhat cumbersome, especially with a large number of counters, and cannot readily be coordinated with a particular point of a luminous trace produced on the screen of an oscilloscope serving to display the amplitude or phase variations of a test voltage from an object energized by the frequency-modulated output of the oscillation generator.

It is, therefore, the general object of my present invention to provide improved means in such an oscillation generator for selecting a frequency to be monitored within an established sweep range.

A more particular object is to provide means for directly correlating the position of a frequency marker, appearing on an oscilloscope screen, with the decadic reading of a visual indicator included in the monitoring circuit.

In accordance with my present invention, a preferably adjustable pulse generator is synchronized with the source of stepping pulses for the decadic counters to emit, once per modulating cycle, a trigger pulse for the readout of a plurality of buffer registers, one for each counter, which are permanently connected to the corresponding counter outputs to receive their readings; such readout actuates a decadic indicator to display the numerical values stored in the buffer registers at the instant of the trigger pulse, i.e. at a time selected within the cycle by the adjustment of the pulse generator.

Pursuant to a more particular feature of my invention, the trigger-pulse generator comprises a comparator receiving in its inputs a continuously changing voltage proportional to the composite output frequency, as derived from the counter outputs with the aid of a digital/analog converter, and a reference voltage from an adjustable voltage source such as a potentiometer. Upon coincidence of these two voltages, the comparator delivers its trigger pulse not only to a transfer circuit between the buffer registers and the decadic indicator but also, advantageously, to the aforementioned oscilloscope receiving the converter voltage in one of its sweep circuits (generally the horizontal one) and the test voltage in its other (vertical) deflection input. The trigger pulse from the comparator distinctively marks a location on the oscilloscope screen corresponding to the numerical value of the composite output frequency as concurrently displayed by the decadic indicator, thereby providing a frequency marker which may be readily shifted across the screen to a point of particular interest such as a discontinuity on the luminous trace. Thus, the decadic indicator instantly gives the frequency anywhere along the trace as marked by either a spike or a bright spot on the screen, depending on whether the trigger pulse is applied to the vertical-deflection input or to the brightness control of the oscilloscope.

The invention will now be described in greater detail with reference to the accompanying drawing the sole FIGURE of which is a block diagram of my improved oscillation generator.

In the drawing as far as applicable, the same reference numerals have been used as in U.S. Pat. No. 3,593,144 to simplify the comparison therebetween.

A multiplicity of ten-stage binary ring counters $6a$ - $6e$ represent respective links of a counting chain, only five such counters having been shown in this embodiment. Each counter controls, via output leads $5a$ – $5e$, a respective gating network $1a$ – $1e$ receiving ten basic frequencies from a source 70 as more fully described in the prior patent. The instantaneous readings of these counters are transmitted via leads $4a$ – $4e$ and other circuitry not shown, including frequency dividers and mixers, to a final mixer 88 producing on its output lead 89 an oscillation whose frequency periodically varies within limits selected with the aid of a controller 13. This controller passes a train of stepping pulses from a pulse generator 8 to the reversible counters via a lead 11 for forward counting or a lead 12 for backward counting; not only the sweep limits and direction but also the stepping rate can be adjusted with the aid of controller 13 in accordance with the disclosure of the prior patent.

Other outputs leads $5a'$ – $5e'$, branched off leads $5a$ – $5e$ (which actually represent bundles of ten conductors each), extend to respective buffer registers $20a$ – $20e$ of a storage unit 20 and, in parallel therewith, to a digital/analog converter 37 whose output lead carries a sweep voltage $x$ for the horizontal deflection of the beam of a cathode-ray tube forming part of an oscilloscope 107. The vertical deflection of the beam is effected by a signal $y$ from a test object to which the frequency-modulated oscillation is applied via lead 89.

A potentiometer 15 delivers a constant but freely selectable reference voltage to one input of a comparator 14 whose other input receives the sweep voltage $x$ from converter 37; the range of adjustability of the potentiometer should, of course, be limited to the sweep range of voltage $x$. Comparator 14, on detecting a match between the two input voltages, gives rise to a trigger pulse on a lead 16 terminating at all the buffer registers $20a$ – $20e$; this trigger pulse causes the transfer of the contents of the buffer registers to respective decoders $18a$ – $18e$ which translate the binary register outputs into decadic signals feeding respective stages $19a$ – $19e$ of a visual indicator 19. In the specific embodiment illustrated, these indicator stages are panels of ten lamps each; it will be understood that other types of indicators (e.g., digit wheels) could also be used.

The trigger pulse from comparator 14 is also applied, via a branch lead 17, to a vertical-deflection electrode of oscilloscope 107 to produce a sharp spike on its screen whenever the sweep voltage $x$ from converter 37 equals the preselected reference voltage from potentiometer 15. Thus, an operator may vary the setting of the potentiometer until the spike coincides with a point of interest of the luminous trace displayed on the oscilloscope screen, the decadic indicator 19 then giving the numerical value of the frequency at that point. This numerical value is periodically read out from the buffer registers of unit 20 inasmuch as the trigger pulse from comparator 14 recurs precisely in the same time position within each sweep cycle as long as the potentiometer 15 is not reset.

Converter 37, comparator 14 and potentiometer 15 together constitute a source of trigger pulses, generally designated 100, which, according to the more general aspect of my invention, need not be tied in with the establishment of a frequency marker on an oscilloscope screen.

I claim

1. In an oscillation generator including a plurality of cascaded decadic counters, circuit means controlled by said counters for producing constituent frequencies depending on the readings of said counters and for synthesizing therefrom a composite frequency, of numerical value represented by said readings, and stepping means for periodically and progressively varying the readings of said counters to vary said composite frequency in successive modulating cycles between selected limits, the combination therewith of:

a plurality of buffer registers, one for each counter, permanently connected to the counter outputs for receiving said readings therefrom;

decadic indicator means adapted to display numerical values between said selected limits;

pulse-generating means connected to operate in synchronism with said counters for emitting a trigger pulse once per modulating cycle; and transfer means responsive to said trigger pulse for transmitting the instantaneous readings of said counters from said buffer registers to said indicator means for visually displaying same.

2. The combination defined in claim 1 wherein said pulse-generating means is adjustable to alter the time position of said trigger pulse in said modulating cycle.

3. The combination defined in claim 2 wherein said counters are provided with converter means connected to their outputs for translating said settings into a continuously changing voltage proportional to said composite frequency, said pulse-generating means comprising selector means for the establishment of a reference voltage and comparison means connected to said converter means and selector means for emitting a trigger pulse upon detecting a match between said changing voltage and said reference voltage.

4. The combination defined in claim 3, further comprising an oscilloscope with a sweep circuit connected to said converter means for energization by said changing voltage and with an input connected to receive a test voltage from an object energized with said composite frequency, thereby displaying on a screen thereof the variations of said test voltage as a function of said composite frequency.

5. The combination defined in claim 4 wherein said comparison means has an output lead terminating at said oscilloscope for distinctively marking a location of said screen corresponding to the numerical value concurrently displayed by said indicator means.

* * * * *